US007693775B2

(12) United States Patent
Korhammer et al.

(10) Patent No.: US 7,693,775 B2
(45) Date of Patent: *Apr. 6, 2010

(54) AUTOMATED SYSTEM FOR ROUTING ORDERS FOR FINANCIAL INSTRUMENTS BASED UPON UNDISCLOSED LIQUIDITY

(75) Inventors: Richard A. Korhammer, New Rochelle, NY (US); Kamran L. Rafieyan, Basking Ridge, NJ (US); Peter J. Wright, Gladstone, NJ (US); Keith P. Chutjian, New York, NY (US)

(73) Assignee: LavaFlow, Inc., New York, NY (US)

( * ) Notice: Subject to any disclaimer, the term of this patent is extended or adjusted under 35 U.S.C. 154(b) by 1463 days.

This patent is subject to a terminal disclaimer.

(21) Appl. No.: 10/348,540

(22) Filed: Jan. 21, 2003

(65) Prior Publication Data

US 2004/0143538 A1    Jul. 22, 2004

(51) Int. Cl.
*G06Q 30/00* (2006.01)
(52) U.S. Cl. .................................................. 705/37
(58) Field of Classification Search ............ 705/35–45; 707/1, 100–104; 709/201–203
See application file for complete search history.

(56) References Cited

U.S. PATENT DOCUMENTS

| 4,674,044 | A | 6/1987 | Kalmus et al. | ............... 364/408 |
| 4,677,552 | A | 6/1987 | Sibley, Jr. | .................... 364/408 |

(Continued)

FOREIGN PATENT DOCUMENTS

EP    0434224    4/1999

(Continued)

OTHER PUBLICATIONS

Chapman, "The Piper Axe.", Traders, Nov. 1, 2000.*

(Continued)

*Primary Examiner*—Mary Cheung
(74) *Attorney, Agent, or Firm*—Greenberg Traurig, LLP

(57) ABSTRACT

A computerized system and method for placing orders for financial instruments with an exchange or alternative trading system is provided. In accordance with this embodiment, updated order book information is received from each of a plurality of trade execution entities. An order for a first financial instrument of the plurality of financial instruments is received from a first user. The order includes a first price per unit component, and a first unit quantity. The first unit quantity includes a disclosed liquidity quantity and an undisclosed liquidity quantity. The order, including the disclosed liquidity quantity and the undisclosed liquidity quantity, is sent to a first one of the plurality of trade execution entities for execution. A reciprocal order for the first financial instrument that does not require that the trade execution entity be the first one of the trade execution entities is received from a second user. The reciprocal order includes a second price per unit component, and a second unit quantity, and the first and second price per unit components have overlapping values. As a function of (1) the price per unit value and the disclosed liquidity quantity for the first financial instrument in the updated order book information, and (2) the first price per unit component and the first undisclosed liquidity quantity, the reciprocal order is sent to one of the plurality of trade execution entities.

36 Claims, 5 Drawing Sheets

U.S. PATENT DOCUMENTS

| | | | | |
|---|---|---|---|---|
| 5,101,353 | A | | 3/1992 | Lupien et al. ............... 364/408 |
| 5,136,501 | A | * | 8/1992 | Silverman et al. ............. 705/37 |
| 5,297,032 | A | * | 3/1994 | Trojan et al. .................. 705/37 |
| 5,689,652 | A | | 11/1997 | Lupien et al. ............... 395/237 |
| 5,717,989 | A | | 2/1998 | Tozzoli et al. ................. 705/37 |
| 5,845,266 | A | * | 12/1998 | Lupien et al. ............. 705/36 R |
| 5,864,827 | A | | 1/1999 | Wilson ....................... 705/35 |
| 5,924,083 | A | * | 7/1999 | Silverman et al. ............. 705/37 |
| 6,012,046 | A | | 1/2000 | Lupien et al. ................. 705/37 |
| 6,269,346 | B1 | * | 7/2001 | Cristofich et al. ......... 705/36 R |
| 6,278,982 | B1 | * | 8/2001 | Korhammer et al. ...... 705/36 R |
| 6,539,362 | B1 | | 3/2003 | Patterson, Jr. et al. |
| 6,625,583 | B1 | | 9/2003 | Silverman et al. |
| 7,110,969 | B1 | * | 9/2006 | Bennett et al. ................ 705/35 |
| 7,110,975 | B2 | * | 9/2006 | Marks de Chabris et al. .. 705/37 |
| 7,127,424 | B2 | * | 10/2006 | Kemp et al. ................... 705/37 |
| 7,136,834 | B1 | * | 11/2006 | Merrin et al. ................. 705/37 |
| 7,181,424 | B1 | * | 2/2007 | Ketchum et al. .............. 705/37 |
| 7,212,994 | B2 | * | 5/2007 | Howell et al. ................. 705/35 |
| 2001/0037284 | A1 | * | 11/2001 | Finkelstein et al. ........... 705/37 |
| 2001/0042040 | A1 | | 11/2001 | Keith ........................ 705/37 |
| 2001/0044770 | A1 | | 11/2001 | Keith ........................ 705/37 |
| 2001/0051909 | A1 | | 12/2001 | Keith ........................ 705/37 |
| 2002/0007335 | A1 | | 1/2002 | Millard et al. |
| 2002/0010672 | A1 | | 1/2002 | Waelbroeck et al. .......... 705/37 |
| 2002/0049667 | A1 | | 4/2002 | Navani et al. |
| 2002/0052827 | A1 | | 5/2002 | Waelbroeck et al. .......... 705/37 |
| 2002/0091617 | A1 | | 7/2002 | Keith ........................ 705/37 |
| 2002/0178104 | A1 | * | 11/2002 | Hausman ..................... 705/37 |
| 2002/0184136 | A1 | | 12/2002 | Cleary Neubert et al. |
| 2003/0093343 | A1 | * | 5/2003 | Huttenlocher et al. ......... 705/35 |
| 2003/0115123 | A1 | | 6/2003 | Lang |
| 2003/0225675 | A1 | * | 12/2003 | Failla et al. ................... 705/37 |
| 2004/0066419 | A1 | | 4/2004 | Pyhalammi |

FOREIGN PATENT DOCUMENTS

| | | |
|---|---|---|
| WO | 9315467 | 8/1993 |
| WO | 9506918 | 3/1995 |
| WO | 9852133 | 11/1998 |
| WO | WO 01/61547 | 8/2001 |
| WO | 0177946 | 10/2001 |
| WO | 0193169 | 12/2001 |
| WO | 0195226 | 12/2001 |
| WO | 03005150 | 1/2003 |

OTHER PUBLICATIONS

Joshua Levin, Pres., Big J. Software, Inc., What's Wrong with the Instinet/NASDAQ Solution.

U.S. Appl. No. 10/441,750, filed May 20, 2003, Korhammer et al.

U.S. Appl. No. 10/762,123, filed Jan. 21, 2004, Rafieyan et al.

Official Action from the United States Patent and Trademark Office for U.S. Appl. No. 10/441,750 dated Aug. 28, 2008.

Official Action from the United States Patent and Trademark Office for U.S. Appl. No. 10/441,750 dated Apr. 15, 2008.

Official Action from the United States Patent and Trademark Office for U.S. Appl. No. 10/441,750 dated Oct. 3, 2007.

Official Action from the United States Patent and Trademark Office for U.S. Appl. No. 10/762,123 dated Aug. 27, 2008.

* cited by examiner

AUTOMATED SYSTEM FOR ROUTING ORDERS FOR FINANCIAL INSTRUMENTS BASED UPON UNDISCLOSED LIQUIDITY

BACKGROUND INFORMATION

There are currently three primary types of computer accessible trading systems for financial instruments such as stocks, bonds, commodities, derivatives, FX and other securities. The first is the conventional stock exchange system exemplified by the New York Stock Exchange and New York Mercantile Exchange. On such exchanges the market is made for each security by a single registered stock dealer, such as a registered stock specialist, who has a seat on the exchange. In addition to face-to-face and telephone communication to the dealers/specialists on the floor, computers are used to send orders to the dealers/specialists on the exchange floor. Information as to the buy and sell prices (bid/offer prices, respectively) are supplied by the dealer/specialist to the exchange and brokers through the dealer/specialist's trading computer terminal. Electronic orders are matched by the dealer/specialist maintaining an orderly market. Upon matching an order the dealer/specialist confirms the execution with the trading terminal and a central computer which stores transaction data.

The second system is electronic exchanges which utilize electronic access of dealer posted market prices without a negotiating specialist or floor based exchange. The largest of these is NASDAQ. It is a totally computer-based market where each member dealer can make its own market in the stocks traded on the exchange through a computer network. Dealers trading a significant number of shares in a stock in their own name and profiting from the spread (i.e., the difference between the price which they purchase shares and the price for which they sell them) are called market makers. Market makers are most often, but not always, large financial institutions. There are usually a number of market makers in a stock, each bidding and offering stock for themselves or their customers.

The best bid to buy by any market maker and the best offer to sell by any market maker for a security is called the security's "inside market." NASDAQ supplies trading data to the participants via a computer network at three different service levels, known as Level I, Level II and Level III. Level I, inter alia, allows real-time access to the following data: (1) Inside market quotes (highest bid and lowest offer) for listed securities, (2) individual market maker quotations, as well as inside quotes for OTC Bulletin Board listed securities, (3) trade price and volume data. Level II additionally provides, among other things, real-time price quotations for each Market Maker and the inside price for each ATS in its computer network. Level III is a service limited to member dealers, allowing them to provide NASDAQ with their best bid and offer for securities in which they make markets, and receive incoming orders. There are various systems for displaying Level II and III data, such as disclosed in U.S. Pat. No. 5,297,032 to Trojan et al., issued Mar. 22, 1994.

Electronic exchanges may place, match, record and confirm transactions through their computer network. If a market order is placed through, for example NASDAQ without any restrictions, the NASDAQ computers make the actual match between an offer price and the bid price and thus will select the parties for the transaction. However a broker may indicate a preference to buy from or sell to a particular market maker.

Historically, market makers have solely determined the prices for securities on electronic exchanges such as NASDAQ. Non-members must place their orders and their customers' orders with a member dealer who receives a placement fee. Similar to other securities exchanges, electronic exchanges, such as NASDAQ, receive a fee for each such transaction.

NASDAQ also operates two automated execution systems, the Small Order Execution System$^{SM}$ (SOES$^{SM}$) and SelectNet®. SOES is a system that provides automatic execution of market and marketable limit orders, while SelectNet offers delivery of orders with the ability to negotiate or execute those orders. SelectNet is also used to send liability orders to electronic communications networks (ECNs) and unlisted trading privileges (UTP) exchanges that do not participate in autoexecution in SOES or SuperSoes$^{SM}$.

SOES is an automated trading system that lets SOES participants enter and execute orders in active SOES-authorized NASDAQ securities. There are two different set of rules under which the system operates, depending on the class of security: 1) SuperSoes, is used to transact executions in Nasdaq National Market® (NNM) securities, and 2) SmallCap SOES, is used to transact executions in NASDAQ SmallCap$^{SM}$ securities. In either system, reports of executions are sent to the Automated Confirmation Transaction Service$^{SM}$ (ACT$^{SM}$) to be reported to the tape, and then both sides of the transaction are sent to the applicable clearing corporation(s) as locked-in trades for clearance and settlement.

SelectNet offers traders the ability to automate the negotiation and execution of trades. The maximum order size in SelectNet is 999,999 shares. Executions are automatically reported to ACT for public dissemination and sent to clearing for comparison and settlement. SelectNet also identifies incoming and outgoing orders and allows the market participant to see subsequent messages and negotiation results. These services are described in more detail in NASDAQ TRADING MANUAL (2001), the entire disclosure of which is hereby incorporated by reference.

The third trading system is alternative trading systems ("ATS") which provide ATS members and electronic exchange users, such as NASDAQ users, an electronic network by which they may display and execute their orders independent of a market maker or specialist. By doing so, members avoid conventional fees while enjoying more current and complete market information. Examples of ECNs include Instinct, ARCA, BRUT, BTRD, and Island. Other ATSs include NASDAQ's Primex System and NYFIX's Millennium System.

Each member of an ECN has a trading terminal that is connected with the ECN's central order book computer. Members display their bids and offers and conduct transactions through the resulting network. The ECN's order book computer keeps track of bid/offer information including price, volume, and execution for each open and closed transaction as supplied to it in real time by its members. The order book computer also records which computer, and thus, which member posted each bid or offer. Once a bid is hit or an offer is taken through the central order book computer, the central order book and members' trading terminals are so updated and the accepted bids and offers are no longer displayed.

ECNs were originally developed for their members to trade amongst themselves. Thus, each ECN developed its own terminals and protocols. The ECN receives a fee, normally based on transaction volume, for each transaction.

In a conventional stock exchange or an electronic exchange, buyers and sellers are subjected to intermediaries in the transaction, i.e., respectively the specialist or the market maker dealing in a particular security. However, in an ECN, each bid and offer is a discrete and anonymous order, fully viewable by and accessible to all its members. Accordingly a broker/dealer member or for that matter, simply a member, may have a number of bids and offers at different prices, posted on an ECN's central order book. There are no specialist or dealer intermediaries for these orders, thus removing third party delays and fees typically associated with traditional exchanges and electronic exchanges. The member controls through its trading computer all aspects of trading securities including order entry, price, volume, duration and cancellation. The member may, at its discretion, select desirable transactions from all open orders available as displayed from the ECN's central order book. The member may choose from the inside market for the security or at a worse price outside of the inside market. Such freedom is highly desirable. For example, it may be a wise strategy to buy securities at a price equal to or higher than the best offer in order to obtain more shares than the inside offer is displaying. This strategy also recognizes that the inside market is moving quickly and may not be available when trying to take the best offer.

U.S. Pat. No. 6,278,982, assigned to Lava Trading, Inc., describes a securities trading consolidation system where each customer uses a single trader terminal to view, and analyze security market information from and to conduct security transactions with two or more ECNs, or other comparable ATSs, alone or in combination with one or more electronic exchanges. A consolidating computer system supplies the market information and processes the transactions. The consolidating computer system aggregates order book information from each participating ECN order book computer including security, order identification, and bid/ask prices information. Bid and ask prices for participating electronic exchanges may be integrated into the display. The combined information is displayed to a customer by security and by bids and offers, and then sorted by price, volume and other available attributes as desired by the customer. The consolidating computer system forwards to each trading terminal information from only those market maker ECNs and electronic exchanges that the customer is an ECN member or electronic exchange user and thus entitled to receive.

SUMMARY OF THE INVENTION

In connection with the various systems for trading financial instruments which are described above, it is known to place an order (e.g., a bid to buy or an offer to sell) for a financial instrument which can include undisclosed liquidity (e.g, a reserve or hidden quantity). For example, it is possible to place an order to sell 2000 shares of a stock (e.g., DELL) at a given price per unit (e.g., $25.05), and specify that 100 shares are to be displayed (the disclosed liquidity), with 1900 shares in reserve or hidden (the undisclosed liquidity). When such an order is placed, other users (e.g., traders or dealers) will only be informed that an offer for 100 shares of DELL exists at 25.05, and will be unaware of the reserve quantity of 1900 shares. Users of a system place undisclosed liquidity to minimize market impact, to remain anonymous, and to fulfill best execution mandates. Such "undisclosed" liquidity may have adverse affects for the user that placed the liquidity, who may be traded through, and for other users that are trying to potentially execute against the liquidity who may trade through the undisclosed liquidity, thereby getting a worse price, or may require many transactions against the undisclosed liquidity, resulting in potential inefficiencies in trading costs.

In accordance with a first embodiment of the present invention, a computerized system and method for placing orders for financial instruments with an exchange or alternative trading system is provided. In accordance with this embodiment, updated order book information is received from each of a plurality of trade execution entities. The updated order book information includes, for each of a plurality of financial instruments, a current bid price with a corresponding disclosed liquidity quantity and a current offer price with a corresponding disclosed liquidity quantity. The plurality of trade execution entities may include ECNs, exchanges, and broker dealers, for example.

An order for a first financial instrument of the plurality of financial instruments is received from a first user. The order includes a first price per unit component, and a first unit quantity. The first unit quantity includes a disclosed liquidity quantity and an undisclosed liquidity quantity. The order, including the disclosed liquidity quantity and the undisclosed liquidity quantity, is sent to a first one of the plurality of trade execution entities for execution.

A reciprocal order for the first financial instrument that does not require that the trade execution entity be the first one of the trade execution entities is received from a second user. The reciprocal order includes a second price per unit component, and a second unit quantity, and the first and second price per unit components have overlapping values. For example, if the order is a bid to buy 100 shares of DELL at $25.65, an offer to sell DELL at $25.65 (or less) would be a reciprocal order having an overlapping price per unit component.

As a function of (1) the price per unit value and the disclosed liquidity quantity for the first financial instrument in the updated order book information, and (2) the first price per unit component and the first undisclosed liquidity quantity, the reciprocal order is sent to one of the plurality of trade execution entities.

In accordance with another embodiment of the present invention, a method for routing an order for a financial instrument to one of a plurality of trade execution entities is provided. The method comprises maintaining information regarding disclosed liquidity and undisclosed liquidity for a plurality of financial instruments; receiving an order for one of the plurality of financial instruments, the order not requiring routing to any particular one of the plurality of trade execution entities; and sending the order to one of the plurality of trade execution entities as a function of the disclosed liquidity information and undisclosed liquidity information for the one of the plurality of financial instruments.

In accordance with another embodiment of the present invention, a system and method for processing and routing orders for financial instruments to a plurality of trade execution entities is provided. A first order is received from a first user. The first order is one of a bid for a financial instrument and an offer for the financial instrument, and the first order includes a price per unit value for the financial instrument and an order quantity for the financial instrument. The order quantity includes a disclosed liquidity value and an undisclosed liquidity value. The first order, including the disclosed liquidity value and the undisclosed liquidity value, is transmitted to one of the plurality of trade execution entities. Updated order book information is received from each of the plurality of trade execution entities. The updated order book information includes bids and offers for the financial instrument, and each bid and each offer includes respective price per unit values and respective disclosed liquidity values.

If the first order is a bid, and a second order is received which includes an offer for the financial instrument at an overlapping price per unit value, which does not require any particular one of the plurality of trade execution entities, and which includes a respective order quantity, the system and method:

(i) selects a highest bid for the financial instrument, based upon the price per unit value of the offer of the second order and the price per unit value of each of the bids for the financial instrument in the order books;

(ii) selects an order quantity for the highest bid which is the lesser of the order quantity of the second order and 1) if the highest bid is the first order, a sum of the disclosed liquidity value and the undisclosed liquidity value; and 2) if the highest bid is one of the bids for the financial instrument in the order books, the disclosed liquidity value for the bid.

Steps (i) and d(ii) are then repeated for a next highest bid until a sum of the selected order quantities is equal to the order quantity of the second order. For each selected bid, a corresponding order specifying the selected order quantity is sent to the one of the plurality of trade execution entities associated with the selected bid. It should be noted that the market data may change while the system is executing (i) and (ii) above. Preferably, therefore, when the system evaluates the "next highest bid", it does so based upon updated market data in the order book information.

If the first order is an offer, and a second order is received which includes a bid for the financial instrument at an overlapping price per unit value, which does not require any particular one of the plurality of trade execution entities, and which includes a respective order quantity, the system and method:

(i) selects a lowest offer for the financial instrument, based upon the price per unit value of the bid of the second order and the price per unit value of each of the offers for the financial instrument in the order books;

(ii) selects an order quantity for the lowest offer which is the lesser of the order quantity of the second order and 1) if the lowest offer is the first order, a sum of the disclosed liquidity value and the undisclosed liquidity value; and 2) if the lowest offer is one of the offers for the financial instrument in the order books, the disclosed liquidity value for the offer.

Steps (i) and (ii) are then repeated for a next lowest offer until a sum of the selected order quantities is equal to the order quantity of the second order. For each selected offer, a corresponding order specifying the selected order quantity is sent to the one of the plurality of trade execution entities associated with the selected offer. It should be noted that the market data may change while the system is executing (i) and (ii) above. Preferably, therefore, when the system evaluates the "next lowest", it does so based upon updated market data in the order book information.

In accordance with another embodiment of the present invention, a computer system is provided which includes a market data server and an order server. The market data server receives order book information for a plurality of trade execution entities. The order server is configured to receive, from one or more users, orders for one or more of a plurality of financial instruments, at least some of the orders including a disclosed liquidity value and an undisclosed liquidity value. The order server also receives the order book information for the plurality of trade execution entities from the market data server. The order server routes each received order to one of the plurality of trade execution entities as a function of the order book information, and the undisclosed liquidity values of other ones of the received orders.

In accordance with a further embodiment of the present invention, the order server includes a plurality of order servers and the one or more users include a plurality of users. Each of the plurality of order servers receives orders from a subset of the plurality of users, and each of the plurality of order servers transmits the undisclosed liquidity values of its received orders to the market data server. The market data server, in turn, transmits the undisclosed liquidity values it receives to each of the plurality of order servers.

In accordance with another embodiment of the present invention, a computerized method for placing orders for financial instruments with an exchange or alternative trading system. The method includes receiving updated order book information from each of a plurality of trade execution entities. The updated order book information includes, for each of a plurality of financial instruments, a current bid price with a corresponding disclosed liquidity quantity and a current offer price with a corresponding disclosed liquidity quantity. An order is received from a first user for a first financial instrument of the plurality of financial instruments. The order includes a first price per unit component, and a first unit quantity, the first unit quantity including a disclosed liquidity quantity and an undisclosed liquidity quantity. Based upon the order, a first sub-order, including the first price per unit component and the disclosed liquidity quantity and not including the undisclosed liquidity quantity, is sent to a first one of the plurality of trade execution entities for execution. From a second user, a reciprocal order for the first financial instrument is received that does not require that the trade execution entity be the first one of the trade execution entities. The reciprocal order includes a second price per unit component, and a second unit quantity, and the first and second price per unit components having overlapping values. As a function of (1) the price per unit value and the disclosed liquidity quantity for the first financial instrument in the updated order book information, and (2) the first price per unit component and the first undisclosed liquidity quantity, the method identifies a target one of the trade execution entities to which the reciprocal order is to be sent. If the target one of the trade execution entities is the first one of the trade execution entities, the method sends a second sub-order, including the first price per unit component and a second disclosed liquidity quantity equal to at least a portion of the undisclosed liquidity quantity to the target one of the trade execution entities; and then sends the reciprocal order to the target one of the trade execution entities. If the target one of the trade execution entities is not the first one of the trade execution entities, the method sends the reciprocal order to the target one of the trade execution entities.

In accordance with other embodiments of the present invention, computer readable media are provided which have stored thereon computer executable process steps operable to control a computer(s) to implement the embodiments described above.

DETAILED DESCRIPTION OF THE PREFERRED EMBODIMENTS

Figure 1:
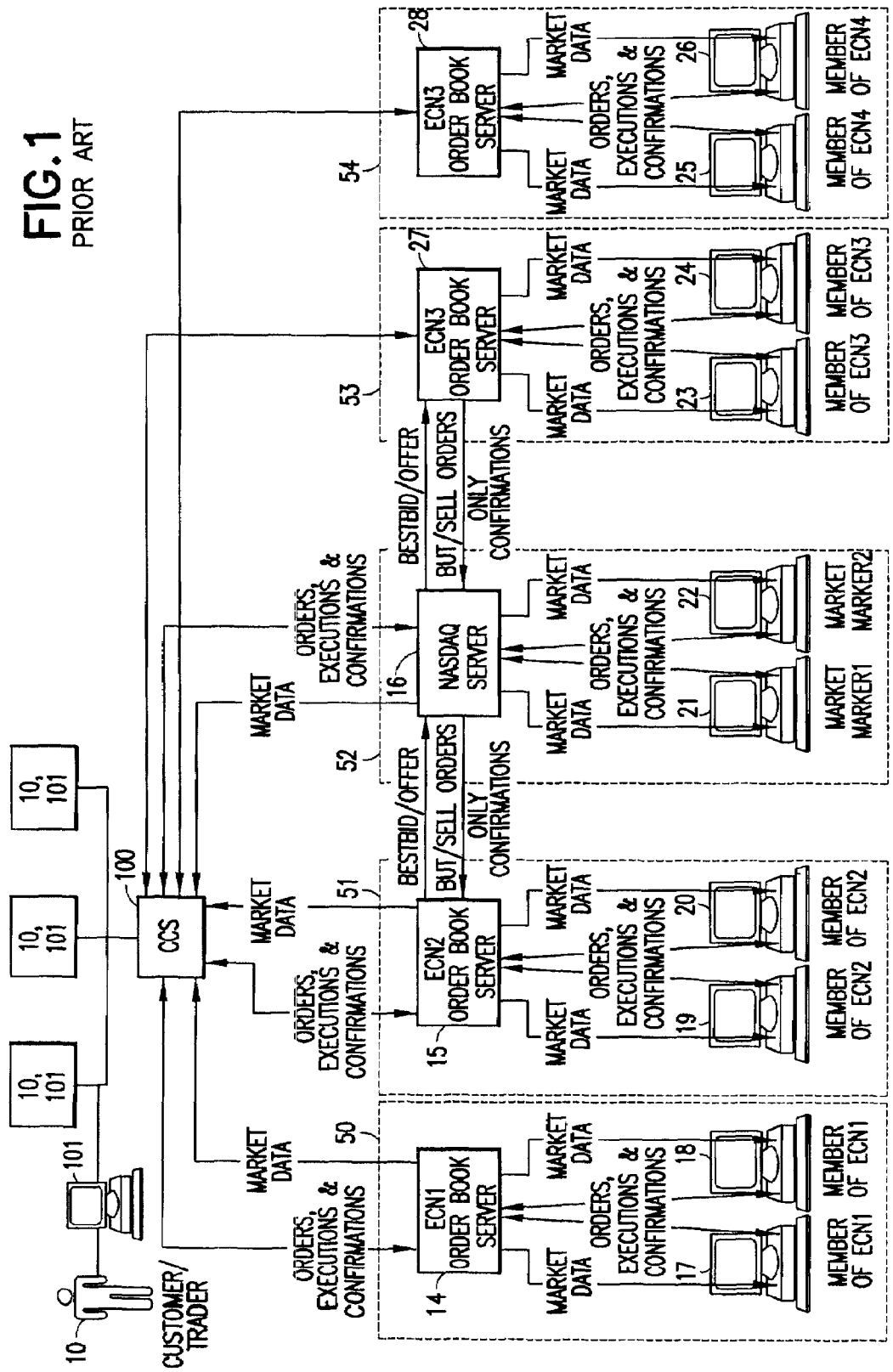
FIG. 1 shows an exemplary system that can be used to implement the embodiments of the present invention.

In connection with transactions for financial instruments such as securities, it is known to place an order (e.g., to sell, or to buy) that contains a displayed value and a reserve (or hidden) value. In this context, if a user A (for example, a broker or dealer) wishes to buy 20,000 shares of INTC, it may do so by placing a bid for 1000 shares at a given price (52.14) as a NASDAQ market maker (or on to an ATS), while maintaining the remaining 19,000 shares in reserve. Similarly, if user B (for example, another broker or dealer) wishes to sell 40,000 shares of INTC, it may do so by placing an offer for 2000 shares at a given price (e.g. 52.15) as a NASDAQ market maker (or on to an ATS) while maintaining the remaining 38,000 shares in reserve. If the bid/offer was placed with NASDAQ, receivers of level I and II NASDAQ information would know that a bid exits for 1000 shares of INTC at 52.14 and that an offer to sell exists for 2000 shares of INTC at 52.15. However, with the exception of user A, all receivers of this NASDAQ information would be unaware of user A's hidden reserve of 19,000. Similarly, with the exception of user B, all receivers of this NASDAQ information would be unaware of user B's hidden reserve of 38,000. If the bid/offer was placed on an ATS, each ATS member would know that there was a bid for 1000 shares of INTC at 52.14 and that there was an offer for 2000 shares of INTC at 52.15. However, with the exception of user A, all of the ATS members would be unaware of buyer A's hidden reserve of 19,000. Similarly, with the exception of user B, all ATS members would be unaware of buyer B's hidden reserve of 38,000. Therefore, another user, being unaware of the hidden liquidity available in the above-reference reserves, might only take the offer for 2000 shares at 52.15, or hit the bid for 1000 shares at 52.14, or may trade through to the next price level, despite the fact that he or she was interested in purchasing/selling a greater number of shares at the respective prices.

In accordance with an embodiment of the present invention, a system is provided which monitors undisclosed (e.g., reserve or hidden) quantities that are available from users (e.g., brokers and/or dealers) on a network, but which are not displayed to other users on the network. When the system receives a bid/offer for a given amount (e.g., offer to sell 20,000 shares of Dell), it will take into account not only the corresponding displayed offer/bid, but also any undisclosed quantity (e.g., a displayed bid to buy 1000, with a reserve of 15000), and will hit the offer/bid up to an amount equal to the displayed (or disclosed) quantity plus the undisclosed quantity (e.g., in the amount of 15000 shares of Dell, even though the displayed amount is only 1000).

To facilitate the discussion of the present invention, it is helpful to consider the general prior art architecture in connection with which the embodiments of the present invention may be used. It should be understood, however, that other architectures may also be used. Referring to FIG. 1, four user/traders 10 use several ECNs and NASDAQ to do their trading. In this simple example, each trader 10 is a member of two ECNs, ECN1 50 and ECN2 51, and one electronic exchange, NASDAQ 52, all of which are accessed via trading a respective terminal 101. A consolidating computer system (CCS 100) is connected to each terminal 101 and to ECN1's order book server 14, ECN2's order book servers 15, and the NASDAQ server 16. In turn, ECN1's order book server 14 is connected to the trading terminals of its other members 17 and 18 and ECN2's order book server 15 is connected to its other member's trading terminals 19 and 20.

Unlike ECN'S, NASDAQ has market makers and users. Market makers are responsible for maintaining the market in particular securities. Market makers post their best bid and offer from their proprietary and customer orders for each security in which they make a market to NASDAQ. Market makers accept orders from users and other market makers, and can execute orders with other market makers and ECNs. When executing with a market maker, users may only buy stock at the market makers' displayed offer price and sell stock at the market makers' bid price, i.e., take (lift) the offer or hit the bid.

ECN1 50 is a closed network that does not interact with other ECNs or NASDAQ. ECN1's order book server interacts with trading terminals 101 (coupled to CCS 100) and with its trading terminals 17 and 18 (which are not coupled to CCS 100) in the same manner. The ECN1 order book server 14 exchanges orders, executions and confirmations with its trading terminals 17& 18 (and via CCS 100, trading terminals 101) and based on this information supplies market data to each of its trading terminals 101, 17 and 18. In other words, each of trading terminals 101, 17 and 18 supplies its orders to the ECN1 order book server 14. ECN1's order book server 14 aggregates this information to construct ECN1's order book, which is in turn, supplied to each of its trading terminals 101, 17& 18.

ECN2 51 similarly interacts with its trading terminals 101, 19 and 20. However, ECN2 51 is a SEC conforming ECN that is integrated with NASDAQ. ECN2 51 delivers its best bid and offer for each security traded on it to NASDAQ to be displayed by NASDAQ in combination with the best bid and offer from other conforming ECNs and market makers. ECN2 51 and its members posting its best bid or offer must accept hits from users of NASDAQ 52 corresponding to ECN2 51 posted best bid and offer. Depending on whether it is able to execute those orders (i.e. if the best bid or offer is still available), ECN2 51 will send confirmations or rejections to NASDAQ 52. NASDAQ 52 does not receive ECN2's full order book, only the best bid and offer for each security. On the other hand, a conforming ECN that is integrated with NASDAQ 52 does not receive pricing information from NASDAQ 52 and thus can not make NASDAQ market data available to its members. However, an individual member of an ECN may, if entitled as a broker/dealer or otherwise, separately purchase a feed from NASDAQ.

Traders 10 are not members of ECN3 53 consisting only of order book server 27 and trading terminals 23 and 24. ECN3 53 is a conforming ECN integrated with NASDAQ 52, thus trader 10 will only be able to view information about ECN3 53 on trading terminal 101 and this information will only be the best bid and offer for a security from ECN3 53.

Finally, traders 10 are not members of ECN4 54 consisting only of order book server 28 and trading terminals 25 and 26. ECN4 54 is not a conforming ECN that is integrated with NASDAQ. Thus traders 10 do not have access to an ECN4 trading terminal and will not be able to view information about ECN4 54 on trading terminal 101.

For purposes of illustration, ECN3 and ECN4 are shown connected to CCS 100 via a single double-arrowed line, to schematically indicate that ECN3 and ECN4 are accessed by the CCS 100, but not by users 10. They may, however, be accessed by other users of CCS 100, who are members of ECN3 and ECN4 respectively.

The CCS 100 performs a number of interrelated functions that may be carried out on one computer or a network of computers. CCS 100 collects orders from each ECN (ECN1 50, ECN2 51, ECN3 53 and ECN4 54) and electronic exchanges (NASDAQ 52), and distributes a composite order book to the user/traders according to each user/trader's memberships in the ECNs and rights to use an electronic exchange. Thus, a user/trader 10 may only receive a subset of the complete order book compiled by the CCS 100 corresponding to where the user/trader 10 is permissioned. In this example user/trader 10 has access to ECN150 and ECN251 and NASDAQ 52, but not ECN3-53 (except through NASDAQ 52) and ECN4-54.

The customized order book is displayed on the user/trader's terminal 101 normally organized by security and price. This allows the user/trader 10 to compare the information from all of the ECNs 50 and 51 of which it is a member; NASDAQ's market makers 21 and 22; and ECN3 53 best bid an offer in a single display to simplify the decision process. Analytical calculations from this data may also be displayed and used to aid the trader in making buy/sell decisions.

At trading terminal 101, the user/trader may filter and/or customize the data displayed based on trading preferences. These features allow the user/trader to remove orders that are less desirable and view the data in a format optimized for their trading activity. As an example, a user/trader may specify a minimum quantity for a bid or offer to be displayed. As another example, the user/trader may customize the display by specifying a minimum price granularity (the smallest allowable increment) for displaying bids or offers (i.e. such as ⅟₃₂ of a dollar), which will cause prices with greater granularity to be rounded as appropriate.

When a user/trader 10 wishes to place an order, he/she may use trading terminal 101 to send the order to the CCS 100. Based on parameters indicated by the user/trader, CCS 100 will determine when and where to place the order. For example, the CCS 100 could break up a single order, routing it to more than one ECN and/or electronic exchange. It should be noted that although the CCS 100 is shown in FIG. 1 as a single, central, computer, it may in practice be implemented as a network of computers, and, moreover, certain of its functions may also be performed by the terminal 101.

There are a variety of types of orders that a user/trader 10 may wish to place, and the following examples are meant to demonstrate some of the uses of the embodiments of the present invention. For example, a limit order is an order type in which the user/trader specifies minimum sales price (in the case of an offer) or a maximum purchase price (in the case of a bid) in addition to the number of shares which the user/trader wishes to sell or buy. In contrast, a market order is an order type in which the user/trader agrees to buy or sell a specified number of shares at the best price available at the time the order is executed. Other types of orders will be discussed in more detail below. In the system of FIG. 1, when a user/trader 10 wishes to place an order, the order is first sent from the terminal 101 to the CCS 100, and then sent from the CCS 100 to, for example NASDAQ 52 or one of ECNs 50-51. In the context of the present invention, the term ticket order will be used to refer to orders sent from the terminal 101 to the CCS 100, the term external order will be used to refer to orders sent from the CCS 100 to NASDAQ or an ECN, and the term order will be used to generically refer to either or both the ticket order and the external order. In many cases, there will be a one-to-one relationship between the ticket order and the external order. However, in some cases, a single ticket order may be divided by the CCS 100 into a plurality of external orders.

A user interface for placing orders will now be described in connection with the LAVA TRADING FLOOR® software available from Lava Trading, Inc. It should be appreciated, however, that while the user interface described herein is preferred, any user interface could be used to place orders in connection with the embodiments of the present invention. Moreover, orders may be placed without the use of any user interface. For example, orders may be placed automatically via software without any user interaction or user display.

Figure 2:
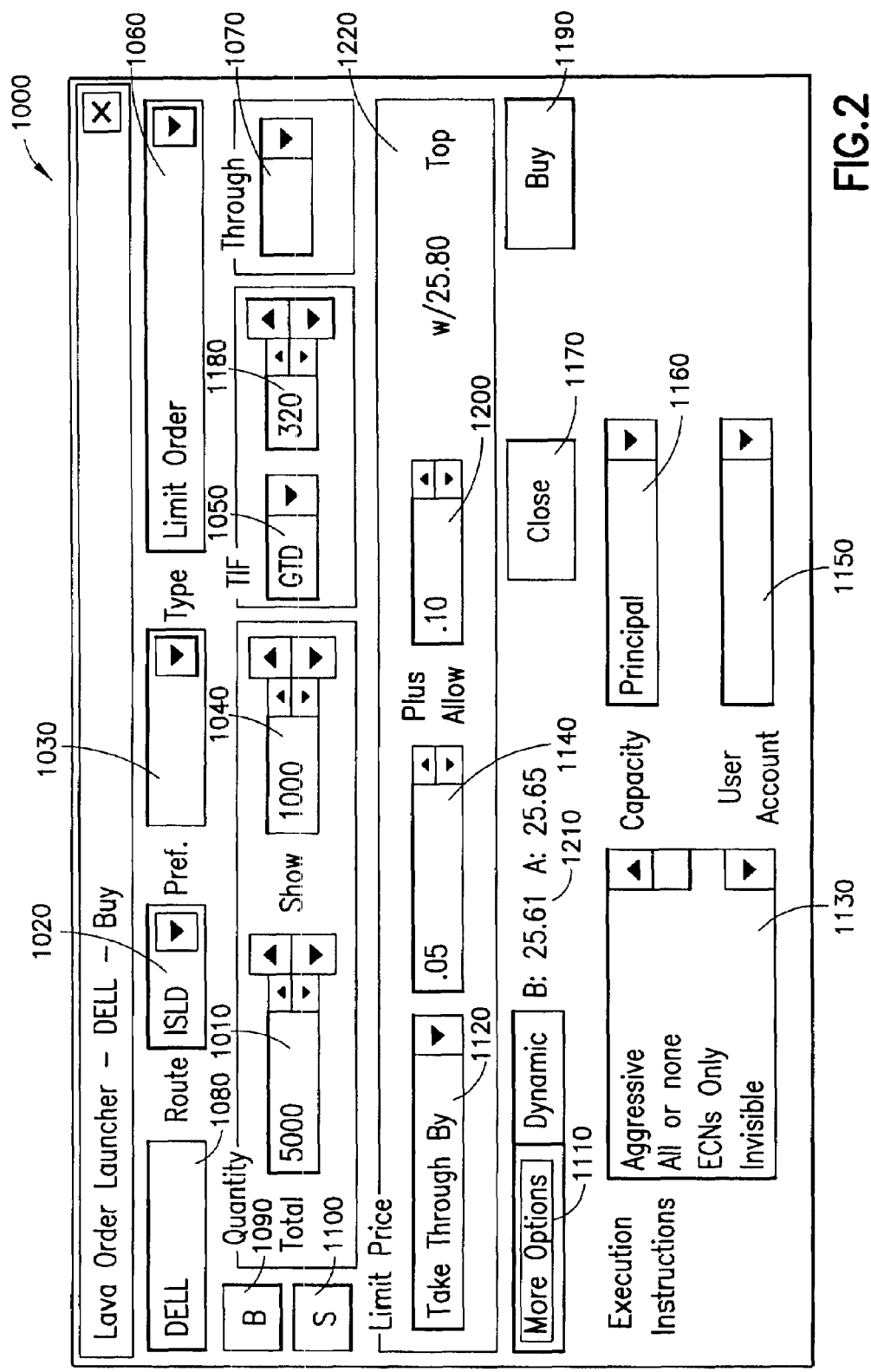
FIG. 2 shows an illustrative graphical user interface for entering orders into the system of FIG. 1.

FIG. 2 shows a "Lava Order Launcher" screen 1000 for the above-referenced software. It should be noted that FIG. 2 is used to illustrate a large number of fields and options that are available to a user from the "Lava Order Launcher", and that not all of these fields and options will be displayed or be available for all order types. Moreover, it should be appreciated that the Lava Order Launcher screen of FIG. 2 is used merely to illustrate a possible graphical user interface for placing orders, and that other configurations may alternatively be used. In any event, referring to FIG. 2, the screen includes: a symbol field 1080 for identifying the security to be traded; a route field 1020 drop-down box which indicates the route to which the order will be sent (in this case, Island, an ECN), and a "type" field 1060 which indicates the order type (in this case, a limit order). A quantity section includes a "total" field 1010 which indicates a total number of shares to be traded; a "show" field 1040 which, when used, indicates the amount of shares the user wishes to be "shown" as being traded to other users who receive information regarding the order from, for example, NASDAQ or an ECN (i.e., the disclosed liquidity). This feature is used for specifying a reserve quantity in an order, as described in more detail below. A time in force (TIF) field includes a drop-down selection box 1050 and a time field 1080 which together, define an expiration time for the order. A limit price field includes a drop down selection box 1020 (in this case Take through by), a price offset field 1040, a discretion field 1200, and a calculated limit price 1220 (in this case, 25.8, which equals the inside offer (25.65) minus the offset (0.05) minus the discretion (0.10)). A through field 1070 allows the user to be able to trade anonymously by selecting an alternate firm to be the executing broker dealer for the indicated trade. This field can be used with any order type. A buy button 1090, when selected (as shown), indicates that the order is a buy order (or bid). A sell button 1100, when selected, indicates that the order is a sell order (or offer). The current inside "bid" and "ask" (i.e., offer) price are displayed in field 1210 (in this case, a bid of 25.61 and an offer of 26.65). A close button 1170 is provided, which, when executed, closes the window without executing any trade. An execute button 1190 (in this case, indicating a buy order) causes the order to be executed. When the more options button 1110 is selected (as shown), the execution instructions field 1130, the capacity field 1160, and the user account field 1150 are displayed.

The "pref" field 1030 is used to indicate a specific counterparty with which the user would like to trade, if the trade execution entity supports such a feature. For example, Nasdaq would offer this field for their SelectNet execution system so that a user can indicate the specific broker dealer with which they would like to trade. It should be noted that if the user is routing an order directly to an ECN, this field would generally not be used as counterparties on ECNs are in current ECN systems, anonymous.

In any event, returning to FIG. 2, there are preferably 8 options for the selection box 1120 for buy limit orders, and 8 options for the selection box 1120 for sell limit orders. The options for buy limit orders preferably include: 1) "High Bid by", to post a bid at the inside bid price (e.g., 25.61) plus the amount indicated in field 1140; 2) "Join Bid" to post a bid at the inside bid price; 3) "Below Bid by" to post a bid at the inside bid price minus the amount indicated in field 1140; 4) "Bid below Offer by" to post a bid at the inside offer price (e.g., 26.65) minus the amount indicated in field 1140; 5) "Bid" to post a bid at the amount indicated in field 1140 (Default is the inside bid price); 6) "Take Offer" to post a bid at the inside offer price; 7) "Offer" to post a bid at the amount indicated in field 1140 (Default is the inside offer price); and 8) "Take through by" to post a bid at the inside offer plus the amount indicated in field 1140. The options for sell limit orders preferably include: 1) "Lower Offer by", to post an offer at the inside offer price (e.g., 25.65) minus the amount indicated in field 1140; 2) "Join Offer" to post an offer at the inside offer price; 3) "Above Offer by" to post an offer at the inside offer price plus the amount indicated in field 1140; 4) "Offer over Bid by" to post an offer at the inside bid price plus the amount indicated in field 1140; 5) "Offer" to post an offer at the value in field 1140 (Default is the inside Bid price); 6) "Hit Bid" to post an offer at the inside bid price; 7) "Bid" to post an offer at the amount indicated in field 1140 (Default is the inside offer price); and 8) "Hit through by" to post an offer at the inside bid price minus the amount indicated in field 1140.

As discussed below, for a reserve limit order, the show field 1040 and total field 1010 can be used to specify a reserve amount (reserve=total−show) and a displayed amount (show). For a hidden limit order, the user selects more options 1110, and then selects "invisible" from the execution instructions field 1130.

Another type of order is a "pegged" order. A "pegged" order allows the user to "peg" an ECN order to the same or opposite (i.e., reciprocal) side so that your order will move with the inside price. To enter a pegged order using the Order Launcher of FIG. 2, for Route 1020, enter an ECN, for Order Type 1060, select "Pegged Order" and, in the Quantity field, enter the total quantity 1010 (and show quantity 1040 if defining a reserve). The options for the selection box 1120 for buy pegged orders preferably include High Bid By, On Bid, Below Bid By, and Bid Below Offer By as described above, and the options for the selection box 1120 for sell pegged orders preferably include Low Offer By, At Offer, Above Offer By, and Offer Over Bid By as described above. In this case, in the "Plus Allow" field, the user may enter a value to set the limit price (top/low value 1220) for this order. If the inside price moves beyond this range, the pegged order will act as a limit order and will not follow the inside past its limit. It will resume 'pegging" or following the inside price when the inside price moves back within the price range.

Another order type is the sweep order. With a sweep order, a user can specify a total quantity and limit price and the CCS 100 will then pick off all available liquidity within that limit without allowing other users/trader's to know that the user is trying to buy/sell. The sweep will continue to work until filled, cancelled or until it expires based on the user specified duration. To enter a sweep order from the screen of FIG. 2, select buy (field 1090) or sell (field 1100) and select sweep (field 1060). The route 1020 is specified as "CLBK" (Colorbook). The limit price is specified in fields 1120 and 1140. The quantity to be bought or sold is specified in the total field 1010 (show field 1040 is not used since there is no disclosed quantity in this type of order). If "Aggressive" is selected under execution instructions, bids/offers from the same route will be aggregated into one order at the worst displayed price. If "ECNs Only" are selected under execution instructions, orders will only be directed to ECNs. In any event, when the sweep order executes, it will take any liquidity (e.g., offers, if it's a sweep buy order, or bids, if it's a sweep sell order) that is shown as available within the limit specified in 1120, 1140, and 1200. If a Time In Force (TIF) of Immediate or Cancel is used, the entire indicated quantity will be distributed across all market makers and ECNs showing bids/offers within the limit price specified, weighting the quantity to each participant based on their displayed quantity.

To illustrate the sweep order, consider the following example. An order is entered with the following parameters: Dell (field 1080), CLBK (field 1020), sweep (field 1060), Sell (field 1100), 10,000 (field 1010), hit through by (field 1120), 0.02 (field 1140), 24.04 Low (field 1220). At the time the order is entered, the bids shown for Dell are as follows:

TABLE 1

| ECN/Market Maker | Bid | Quantity |
|---|---|---|
| MLCO | 24.05 | 1000 |
| GSCO | 24.05 | 2000 |
| ISLD | 24.05 | 5000 |
| ARCA | 24.04 | 1000 |
| FBCO | 24.03 | 3000 |

CCS 100 will evaluate the above-bids and determine that the highest current bid is 24.05. It will then assess whether there is enough stock at the 24.05. level to fill the order. The following share amounts are calculated: i) 1,000 shares for MLCO ; ii.) 2,000 shares for GSCO ; iii.) 5000 shares for ISLD, for a total of 8000 shares at the 24.05 level. Since this is not enough to fill the 10,000 share order, CCS 100 moves on to the 24.04 level. At this point, the following share amounts are calculated: 1000 shares for ARCA, for a total of 1000 shares at the 24.04 level. The FBCO bid of 3000 shares at 24.03 is below the minimum price specified in the sweep order. Therefore, a total of 9000 shares are sent in an "initial" sweep to the above-referenced ECNs and market makers. If additional bids become available within the specified limit before the TIF (field 1050, 1180) expires, additional sweeps will be executed. It should be noted that other buyers and sellers in the NASDAQ or in the ECNs will be unaware of the existence of the sweep order, or the desire, on the part of the user/trader initiating the sweep order, to execute a sale of 10,000 shares of Dell.

Another type of order is the Lava ColorBook Market Order. This order type acts as a "sweep order" that executes at the current inside price. In other words, it will exhaust the current inside price level before moving to a worse level (e.g., a lower price for sell order, or a higher price for a buy order). If the inside price improves, CCS 100 will immediately move to that level. Like the sweep order described above, it will keep executing until filled or until expiration based on the duration indicated by the user in TIF (fields 1050,1180). To enter a Lava Market Order from the screen of FIG. 2, select buy (field 1090) or sell (field 1100), select CLBK as the route 1020, "market" as the type 1060, and enter a TIF in fields 1050, 1180. The security to be bought or sold is entered in field 1080, and the amount of shares in the market order is entered in field 1010. Since it is a market order, nothing is entered in the price fields 1120, 1140, and 1200.

Another type of order is the ColorBook Discretion Order. This order type allows a user to post a limit order to an ECN or exchange and then sweep liquidity within a discretion amount using a reserve quantity. To enter a discretionary order in FIG. 2, an ECN (e.g., ISLD) is selected as the route 1020, Limit Order is selected as the order type 1060, and a total quantity 1010 and show quantity 1040 is entered in the quantity section. A limit price is entered in fields 1120 and 1140, and the discretion amount is entered in field 1200. The "show" quantity 1040 of the order is executed at the limit price, and as it is filled, it is refreshed. At the same time, liquidity within the discretion amount will be bought or sold as a sweep order. As an example, consider a ColorBook Discretion Order to sell 10,000 shares of Dell, with a "show" value of 1000, an offer price of 20.00 and a discretion of 0.10. CCS will issue an offer for 1000 shares of Dell at 20.00 (leaving 9000 shares in reserve). As shares are sold at that price, the offer for 1000 shares will be refreshed from the reserve quantity, and the reserve quantity will be reduced accordingly. In addition, CCS will hit any bids for Dell that are within the discretion amount (e.g., greater or equal to 19.90, the offer price 20.00 minus the discretion 0.10) as a sweep order in an amount up to the amount of the current reserve quantity.

There are also variations on the sweep order, including the Sweep and Post and the Sweep Post Hidden. With the Sweep Post Hidden, after the initial sweep order described above, any unexecuted quantity is divided up and posted as "Hidden limit" orders to all permissioned ECNs that support hidden limit orders. When an ECN receives a "hidden" limit order, it will not display the order to the ECN members. However, if an ECN has a hidden buy/sell order, and a corresponding displayed offer/bid within the limit appears, the ECN will match the orders. The Sweep Post Hidden order is initiated in the same manner as the Sweep Order, except that the type 1060 is Sweep Post Hidden.

With the Sweep and Post, after the initial sweep order described above, any unexecuted quantity is posted to one or more trade execution entities as limit orders at the limit price specified in the sweep order. The user can specify which trade execution entities can be used for the "post" portion of the order (e.g., a particular ECN, ECNs only, etc.). In addition, the user can enter a show quantity and a total quantity if the user wishes the "post" portion of the order to be a reserve quantity order. This order is initiated in the same manner as the sweep order, except that the type 1060 is Sweep-Post, and the show quantity field 1040 is used.

Another type of order is the Colorbook Market and Post order. This order initially performs a Colorbook Market Order with Limit Price, and then executes a "post" with any unexecuted quantity in the same manner as the sweep and post order described above.

Another type of order is a ColorBook Probe Order. A probe order allows a user to look for hidden or reserve quantities by issuing, to ECN's and market makers one at a time, with immediate-or-cancel orders for the full remaining quantity of the order. To enter a probe order from FIG. 2, for route 1020, select CLBK, for type 1060, select Probe, in total 1010, enter the quantity, and in price fields 1120 and 1140 enter the limit price.

As noted above, limit orders can specify a reserve quantity. Although a number of ECNs support such reserve orders natively, others do not. In the discussion that follows, the term "reserve quantity order" will refer to both cases, the term "native reserve quantity order" will refer to orders sent to trade execution entities that support reserve orders natively, and the term "non-native reserve quantity" will refer to orders sent to entities that do not support reserve orders natively. A reserve quantity order is a limit order with specified Show Quantity and a balance or reserve quantity which is hidden or not displayed. As the display quantity is depleted, it is automatically replenished from the reserve. Orders at sizes greater than the displayed size will be filled up to the entire reserve quantity. To enter a reserve quantity order in FIG. 2, for Route 1020, select an ECN, for Type 1060, select "Limit Order", entire the total quantity in total 1010, and the show quantity in field 1040. The reserve quantity is the Total 1010 minus the Show 1040. The limit price is entered in fields 1120 and 1140. Field 1200 is not used. In the case of a native reserve quantity order, both the displayed quantity (show 1040) and the reserve quantity (total 1010 minus show 1040) are immediately sent to the selected route 1040. In contrast, with a non-native reserve quantity order, the reserve quantity is maintained at CCS 100, which sends successive limit orders to the ECN to maintain the displayed quantity as the reserve quantity is depleted.

It should be appreciated that the order types described above are not meant to be a complete or exhaustive list of the order types provided by the LAVA TRADING FLOOR software. Rather what is described above is a representative list of order types which are helpful in explaining the various aspects of the embodiments of the present invention.

Many of the order types described above result in "undisclosed" liquidity being generated. In the context of the present invention, liquidity is defined as an existing order (e.g., to buy or sell a financial instrument) which has not yet been filled (e.g., accepted by the opposing party to the transaction by being hit or taken). Liquidity may either comprise "displayed" as "described" liquidity which can be seen by other users (e.g., traders), or "undisclosed" liquidity which cannot be seen by other users. The bids listed in Table 1 above represent disclosed liquidity. Examples of "undisclosed" liquidity include the "posted" quantities in sweep post hidden, the reserve quantity in the sweep and post, the reserve quantity in market and post, and the reserve quantity (e.g., total quantity minus show quantity) in pegged orders and native reserve quantity orders. The "show" quantity 1040 in discretion orders and pegged orders are examples of "disclosed" liquidity. In market and limit orders that do not specify a "show" quantity, the "total quantity" 1010 is disclosed liquidity.

Such "undisclosed" liquidity may have adverse affects on the system, both in terms of the price paid for transactions, and in the overall efficiency of the system. For example, the CCS 100 may receive large numbers of quote updates and ECN orders that contain hidden or reserve amounts where only a small portion of the total order size is displayed and the larger portion remains hidden. Frequently, opposing, similar sized sweep orders are also received by the CCS 100. The sweep order, not knowing that the reserve or hidden amount exists, may hit or take only the displayed quantity. Then, the reserve amount will be used to refresh the displayed size of the initial order, and, assuming the sweep order is not expired, the sweep order will hit or take the refreshed displayed quantity. This results in a large number of executions being generated, resulting in longer times to complete the order. Moreover, it is possible that the sweep order will expire, or that the price of the security will change, resulting in a less advantageous result for at least one of the parties to the transaction.

For example, there may be an ECN sell order for 1000 shares at 11.05, with a reserve quantity of 5000 and a displayed quantity of 1000, and another user may have initiated a reciprocal (i.e., opposing) buy sweep order for 6000 shares with a limit price of 11.06. Seeing only the displayed quantity of 1000, the buy sweep will hit the offer (i.e., the sell order) for the displayed amount of 1000 shares, not knowing that 5000 additional shares are available.

In accordance with an embodiment of the present invention, CCS 100 utilizes the information it receives and/or maintains regarding the hidden and reserve quantities of its user/traders, and make this information available to reciprocal orders from other of its user/traders. This permits orders to hit or take as large a size as is possible, in essence disregarding the displayed size.

In this regard, an order which is placed through the system 1 may fall into one of three categories: i) orders which add undisclosed liquidity to a trade execution entity, which undisclosed liquidity is known to CCS 100; ii) orders which, via CCS 100, can hit or take the undisclosed liquidity referenced in category (i); and iii) all other orders. In the context of the exemplary LAVA TRADING FLOOR software described above, for example, any reserve quantities "posted" in the "sweep post" order types, the hidden quantity in the sweep post hidden order, the reserve quantity (e.g., total quantity minus show quantity) in pegged orders, native reserve quantity orders, and hidden limit orders would fall under category (i); sweep orders (including the sweep portion of the sweep post orders), or any order which specifies CLBK as the route would fall under category (ii), and non-native reserve quantity orders, and any orders which require a specific route and which do not include a reserve or hidden quantity would fall under category (iii). It should be noted that for an order to fall under category (i), the undisclosed liquidity must actually be sent to the trade execution entity. Thus, non-native reserve quantity orders, in which the undisclosed liquidity remain in CCS 100, are not under category (i).

As an example, let us assume that a user/trader updates a NASDAQ order to Buy 50,000 shares of Dell, displaying 1,000 with 49,000 in reserve. Another user/trader enters a sweep order to sell 60,000 shares at a matching price level. CCS recognizes that in spite of the displayed size of 1000 shares, a total of 50,000 shares are available and hits the bid for 50,000 (which SuperSoes and SuperMontage both allow.)

As another example, let us assume that a user/trader enters an order to INCA (an ECN) to Sell 20,000 shares of Dell at the inside offer price, showing 500 shares, with 19,500 in reserve. A second user/trader enters an order to ISLD (an ESN) to sell 20,000 shares of Dell at 0.05 above the inside offer price. A third user/trader enters a sweep order to Buy 20,000 shares of Dell, with a "Take Through By" 0.10. In a conventional system, the CCS would take 500 shares from INCA, and 19,500 shares from ISLD. However, in accordance with an embodiment of the present invention, CCS recognizes that in spite of the displayed size of 500 shares, a total of 20,000 shares are available and takes the order from INCA for 20,000 (which INCA allows).

As described above, there are a number of other order types which have components that can access multiple trade execution entities. Thus, for example, CCS would follow the same process in the case of the initial sweep of the Sweep Post Hidden, and Sweep and Post order types. Moreover, the CCS would follow the process described above for the "sweep" portion of the "ColorBook Discretion Order-Sweep to Complete" order type, or for any order which specifies CLBK as the route 1020.

Figure 3:
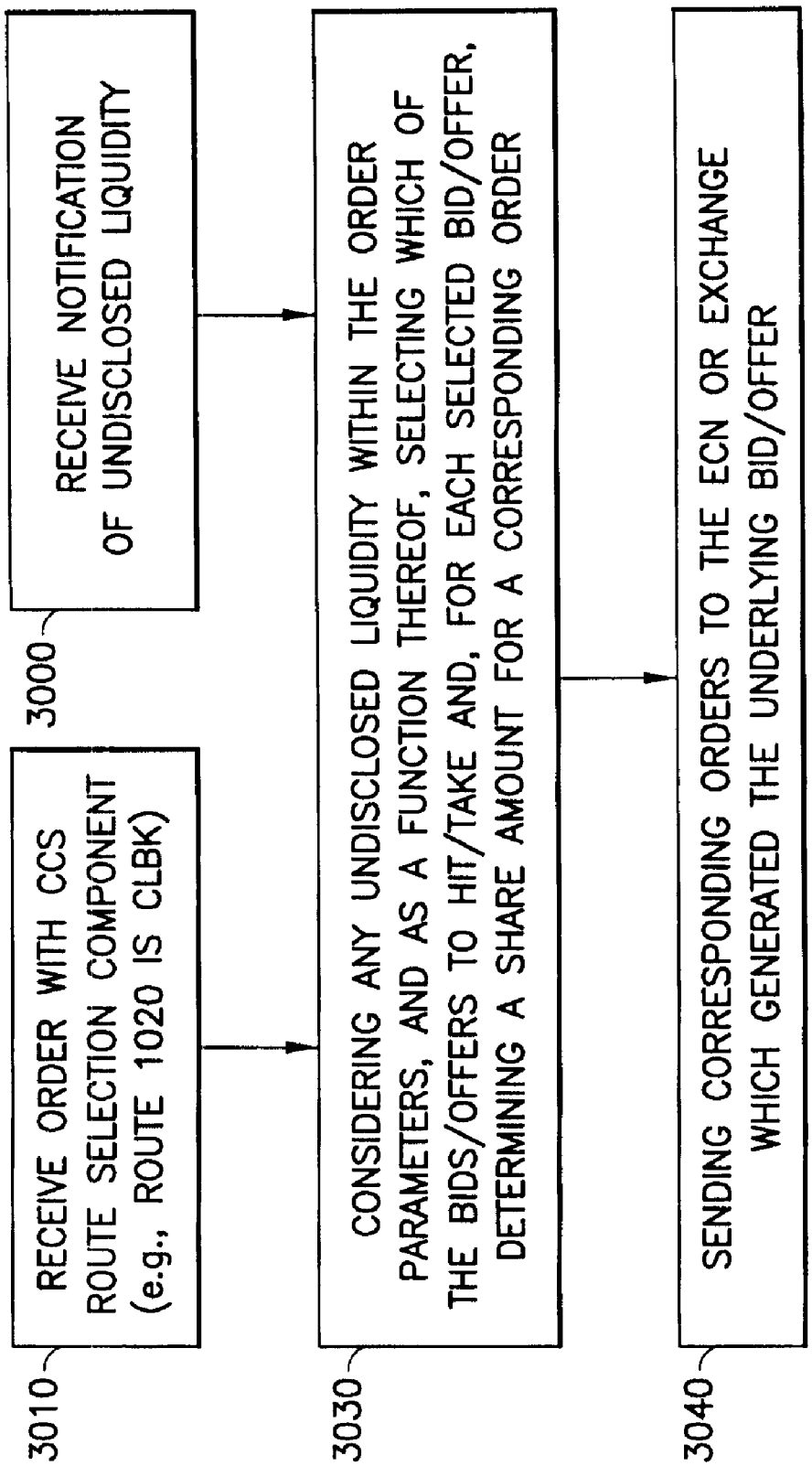
FIG. 3 shows an illustrative flow chart for implementing an embodiment of the present invention.

The above-referenced process is described in the flow chart of FIG. 3. CCS 100 receives a notification of undisclosed liquidity in step 3000. For example, CCS 100 may receive a native reserve quantity order, a hidden limit order, a Pegged Order (with a specified show quantity), or a Sweep and Post (e.g., the reserve quantity order posted after the initial sweep). As described above, each of these order types supports the inclusion of undisclosed liquidity.

In step 3010, the CCS 100 receives an order with a CCS Route Selection Component. In this regard, an order with a CCS Route Selection Component is an order which allows CCS 100 to determine the appropriate route (e.g., the appropriate trade execution entity such as an ECN or NASDAQ). In other words, the order does not require that any particular one of the trade execution entities be the recipient of the order. Examples of orders with CCS Route Selection Components include the Sweep Order, Sweep Post Hidden (e.g., the initial sweep portion of this order), Sweep and Post (e.g., the initial sweep portion of this order); ColorBook Market Order, ColorBook Limit Order and the ColorBook Probe Order. In step 3030, CCS 100 processes the order from step 3010.

When processing the order, CCS 100 will consider any undisclosed liquidity received in step 3000 that falls within the order parameters. For example, if the order was a Sell Sweep for 10,000 shares of DELL with a bottom price of 25.80 (field 1200), CCS 100 would consider any undisclosed liquidity for DELL at or above 25.80. Considering this undisclosed liquidity, along with the disclosed liquidity within the order parameters, CCS 100 will select which of the bid/offers to hit/take, and determine a share amount for each of these selected bid/offers. In the sell sweep example described above, CCS 100 would consider bids for DELL at or above 25.80 (including undisclosed liquidity), and fill the order by hitting the highest bid in an amount up to the lesser of 10,000 shares and the available quantity for the highest bid (including any undisclosed liquidity), and then repeating this process for the next highest bid, until either the total amount of selected bids equals 10,000 shares, or until no other bids are available for DELL at or above 25.80. It should be noted that as the system repeats the process for the next highest bid (or lowest offer), the corresponding market data may change, thereby changing the next highest bid (or lowest offer). Preferably, therefore when considering the "next highest bid" (or next lowest offer), the system considers the updated market data (which is undated via the consolidated order book information).

Once the bids/offers and their respective amounts are selected in step 3030, CCS 100 proceeds, in step 3040 to send these selected bids/offers to the trade execution entity (e.g, ECNs, NASDAQ, etc) which generated the underlying bids/offers.

It should be noted that while the embodiments of the present invention have been described herein primarily with reference to the order types available from the LAVA TRADING FLOOR software, the embodiments of the present invention are generally applicable to any order routing system which is capable of routing undisclosed liquidity to trade execution entities for at least one of its order types, and which is capable of selecting a trade execution entity from a plurality of trade execution entities for at least one of its order types.

In accordance with the embodiments of the invention described above, the undisclosed liquidity information is known only to the system, and is not shared with the user/traders 10. In some embodiments, however, the owner of the undisclosed liquidity (i.e., the user who placed the order which resulted in the undisclosed liquidity being sent to a trade execution entity) may be provided with the option of allowing other users of the system (or selected other users of the system) to view the undisclosed liquidity.

In addition, in accordance with the embodiments of the present invention described above, CCS 100 automatically utilizes the undisclosed liquidity in routing its orders to the trade execution entities, without any interaction from the user/traders 10. In some embodiments, the user/trader 10, or an entity, such as a brokerage, that manages a number of user/traders 10, may have the option of disabling this functionality for orders that they initiate. For example, a user/trader 10 may, for some reason, not wish CCS 100 to use the undisclosed liquidity contained within his or her orders when processing other orders with CCS Route Selection Components. If the functionality is disabled by a user/trader 10, then undisclosed liquidity from that user/trader's orders would not be considered in step 3030 of FIG. 3.

Figure 4:
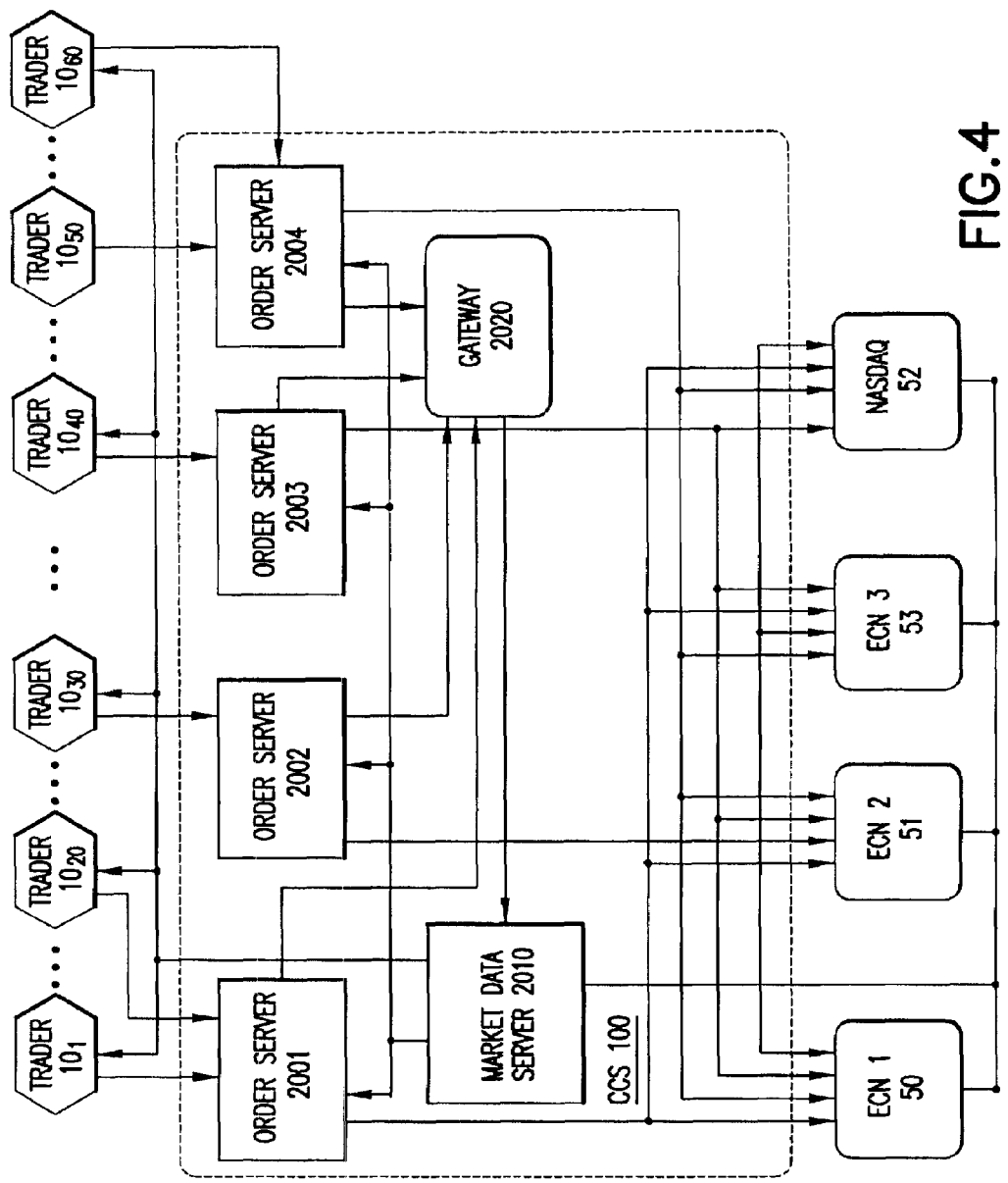
FIG. 4 shows a preferred consolidating computer system which can be used in connection with an embodiment of the present invention.

FIG. 4 shows a system with a particularly preferred CCS 100 which can be used in conjunction with the present invention, with similar components bearing identical reference numbers as FIG. 1. CCS 100 includes four order servers 2001, 2002, 2003, 2004, a gateway server 2020, and a market data server 2010. Traders (users) $10_1$ through $10_{20}$ are coupled to order server 2001, traders $10_{21}$ through $10_{30}$ are coupled to order server 2002, traders $10_{31}$ through $10_{40}$ are coupled to order server 2003, and traders $10_{41}$ through $10_{60}$ are coupled to order server 2004. Order servers 2001 through 2004 are each coupled to gateway server 2020, and the gateway server 2020 is coupled to market data server 2010. Market data server 2010, in turn, is coupled to each of order servers 2001 through 2004, and to each of the traders $10_1$ through $10_{60}$. Order servers 2001 through 2004 are also each coupled to ECN1 50, ECN2 51, ECN3 53, and NASDAQ 52, and ECN1 50, ECN2 51, ECN3 53, and NASDAQ 52 are each coupled to market server 2010.

When one of the traders $10_1$ through $10_{60}$ (hereinafter trader $10_i$) places a ticket order using his or her terminal 101 (not shown for ease of illustration), the order is sent to one of the order servers 2001-2004. The order server then routes the order to one of the trade execution entities (50-53) as a function of the parameters of the order and the market data information received from the market data server 2010. If the order includes undisclosed liquidity, the order server sends information identifying this undisclosed liquidity to the gateway server 2020 (e.g., there is a bid for 2000 shares of DELL being sent to ISLD at 25.10). Preferably, this information is sent to the gateway server 2020 at the same time that the underlying order is sent to the trade execution entity (e.g., ISLD). The gateway server 2020 receives undisclosed liquidity information from each of the order servers 2001 through 2004, and transmits this information to the market data server 2010.

Market data server 2010 also receives streams of market information (including orders, executions, and confirmations) from trade execution entities 50-53, and generates a consolidated order book containing all orders received from the trade execution entities 50-53. Preferably, the undisclosed liquidity information is included in the consolidated order book. Alternatively, the undisclosed liquidity information could be maintained separately. As described above, each Trader $10_i$ receives a sub-set of the consolidated order book, which includes the orders from the trade execution entities 50-53, which that trader has permission to receive. An exemplary method for implementing this process is described, for example, in U.S. Pat. No. 6,278,982, which is incorporated herein in its entirety. As noted above, Trader $10_i$ does not, however, receive the undisclosed liquidity information which was sent to the market data server 2010 from the gateway server 2020.

Market data server 2010 also sends the consolidated order book, as well as the undisclosed liquidity information (which, as described above, may, or may not, be part of the consolidated order book), to each of order servers 2001 through 2004. Each of the order servers then uses the consolidated order book information, and the undisclosed liquidity information, to generate the external orders to the trade execution entities 50-53.

To illustrate this process, consider one of the examples described above, wherein a user/trader (e.g. trader $10_1$) enters a ticket order to INCA (e.g. ECN1) to Sell 20,000 shares of Dell at the inside offer price of 35.65, showing 500 shares, with 19,500 in reserve. A second user/trader (e.g. trader $10_{30}$) enters a ticket order to ISLD (e.g., ECN2) to sell 20,000 shares of Dell at 0.05 above the inside offer price (35.70). Then, a third user/trader (e.g. trader $10_{40}$) enters a sweep ticket order to buy 25,000 shares of Dell, with a "Take Through By" 0.10 (e.g., with a top value of 35.75). Order Server 2001 receives the 20,000 share order to ECN1, and routes it to ECN1. Order server 2002 receives the reserve order, showing 500 shares, with the 19,500 share reserve, and routes it to ECN2. However, since the order includes an undisclosed liquidity of 19,500 shares at the inside offer price, order server 2002 sends information regarding the undisclosed liquidity (e.g., offer sent to ISLD for 19500 shares of DELL at $35.65) to the gateway server 2020, which transmits this information to the market data server 2010. The market data server 2010 sends this undisclosed liquidity information to each of the order servers 2001-2004. As noted above, the market data server 2010 also sends the consolidated order book to each of the order servers 2001-2004.

When the sweep order is received at order server 2003, order server 2003 will evaluate the above-bids and determine that the best current offer is 35.65. It will then assess whether there is enough stock at the 35.65. level to fill the order. The following share amounts are calculated: i) 500 shares for INCA from the consolidated order book); ii.) 19,500 shares for INCA (from the undisclosed liquidity), for a total of 20000 shares at the 35.65 level. Since this is not enough to fill the 25,000 share order, order server 2003 moves on to the 35.70 level. At this point, the following share amounts are calculated: 5000 shares for ISLD, for a total of 5000 shares at the 35.70 level. A total of 25000 shares are then sent in the sweep, with 20,000 shares sent to INCA, and 5000 shares sent to ISLD from order server 2003.

In accordance with the embodiments of the present invention described above, the system considers undisclosed liquidity which has been sent to a trade execution entity when routing a reciprocal order that can access multiple trade execution entities. In such an embodiment, a reserve quantity in the non-native reserve order described above would not be considered when routing a subsequent reciprocal order because these reserve quantities are maintained at CCS 100 and have not yet been sent to the trade execution entity.

In accordance with another and/or further embodiment of the present invention, the system considers undisclosed liquidity which is being maintained in CCS 100 when routing a reciprocal order that can access multiple trade execution entities. As an example of this embodiment, assume that CCS 100 is maintaining undisclosed liquidity for an order which is destined for a particular (hereinafter "target") trade execution entity (e.g., a reserve quantity in a non-native reserve order), and then CCS 100 receives a subsequent reciprocal order (e.g., a Sweep Order). If the order has the best price per unit value (e.g., the highest price per unit value for a bid, or the lowest price per unit value for an offer), CCS 100 will (i) send an order to the target trade execution entity which includes the undisclosed liquidity or a portion thereof; and then (ii) send the reciprocal order to the target trade execution entity. CCS 100 would also update the undisclosed liquidity (e.g., the reserve amount in the non-native reserve order) to reflect the quantity sent to the target trade execution entity in (i). It should be noted that this embodiment may be implemented alone, or in combination with any of the embodiments described above.

It should be noted that although the invention has been described above generally in connection with orders placed by traders or other human users via a user interface, this need not be the case. In the context of the present invention, the term "user" refers to a user of the system, which could be a human user such as a trader, or could be a computer(s) which, for example, automatically places orders without human interaction and without the use of a user interface. As an example, in connection with NASDAQ, market makers frequently update market maker quotes, changing one or more of the bid price, offer price, reserve quantity, and show quantity. These updated market maker quotes are generally placed by computers, without human user interaction. Nevertheless, a market maker quote update, which, for example, changed only the reserve quantity associated with a given market maker bid, would, in accordance with the present invention, be an order (e.g., a bid for DELL with a bid price, a show quantity and the updated reserve quantity) from a user (e.g., a computer associated with the market maker) which provided undisclosed liquidity (the reserve quantity) to the CCS 100.

Figure 5:
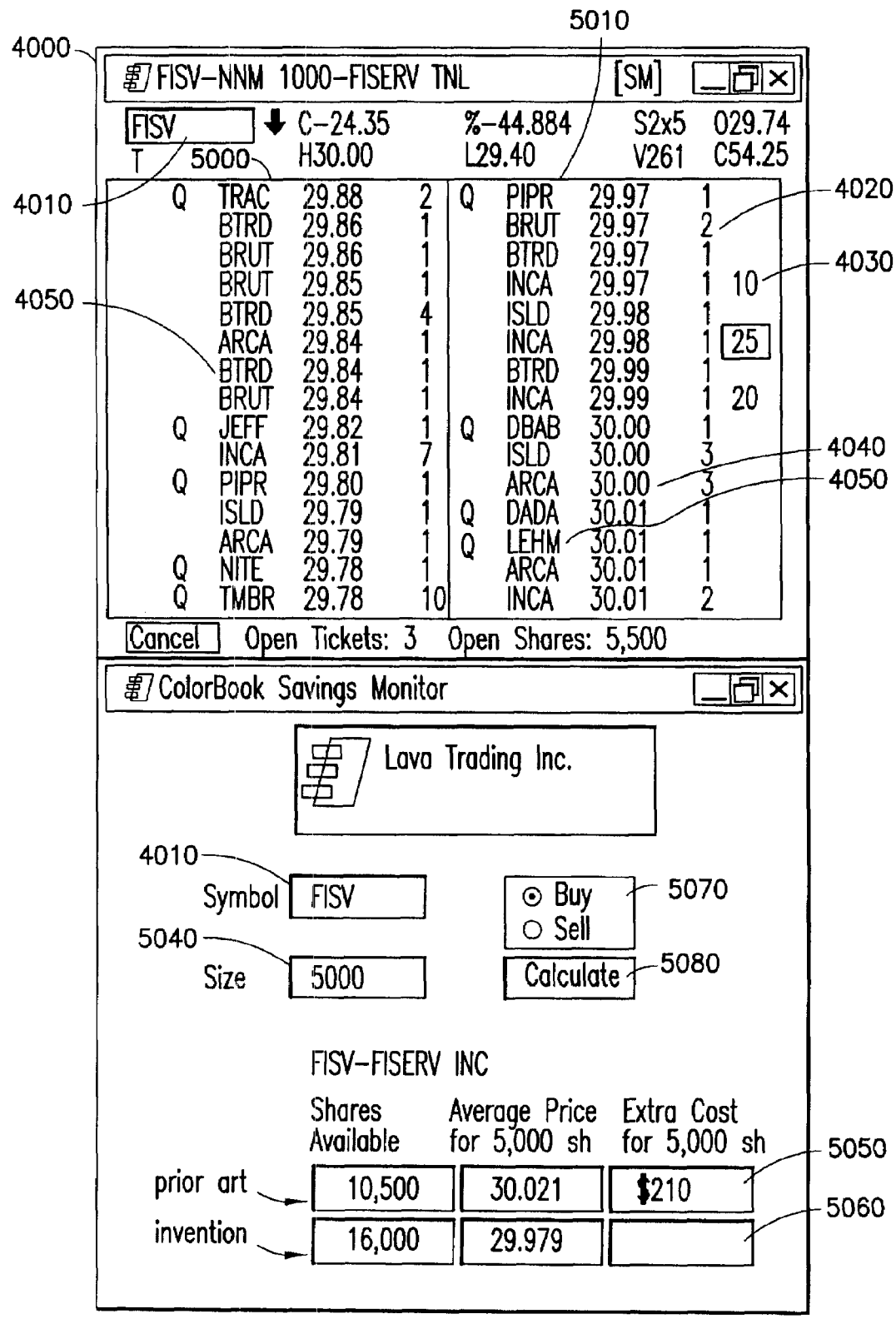
FIG. 5 shows an exemplary screen display which displays the savings provided by a system according to an embodiment of the present invention.

FIG. 5 is a "Savings Monitor" 4000 which may be displayed by the system 1 to illustrate, to a user 10, the savings provided by the embodiments of the present invention. The savings monitor 4000 includes a field 4010 for selecting a financial instrument (in this case FISV) and a quote display divided into a first section 5000 for displaying bids and a second section 5010 for displaying offers. Each line of each section 5000 and 5001 includes information regarding a respective bid or offer, including the trade execution entity 4050, the price 4040, the display (or show) quantity 4020 in hundreds of shares, and, if present, the undisclosed liquidity quantity 4030 known to CCS 100, in hundreds of shares. If a user enters a number of shares in field 5040, indicates buy or sell in field 5070, and clicks on calculate 5080, the hypothetical results are displayed for a prior art system (row 5050) and for an automated system for routing orders based upon undisclosed liquidity in accordance with the present invention (row 5060). The results show the total shares available (for buy or sell), the average price obtained for the quantity identified in field 5040, and the extra cost incurred for the quantity identified in field 5040.

Referring to FIG. 5, three orders have been placed onto the Instinet ECN (INCA) at three different prices, each with a hidden reserve quantity. The first order is an offer to sell shares at 29.97, with a show value of 100, and a reserve quantity of 1,000 shares (section 5010, row 4). The second order is an offer to sell shares at 29.98, with a show quantity of 100 and a reserve quantity of 2500 (section 5010, row 6). The third order is an offer to sell shares at 29.99, with a show quantity of 100, and a reserve quantity of 2000 (section 5010, row 8).

With the prior art system, a total of 10,500 shares are available, and, in order to buy 5,000 shares, a trader would pay an average price of $30.021. In contrast, in accordance with automated system for routing orders based upon undisclosed liquidity in accordance with the present invention, a total of 16,000 shares are available, and, in order to buy 5,000 shares, a trader would pay an average price of $29.979. As a result, the use of the system in accordance with the present invention could result in the trader paying $210 less for the purchase of 5000 shares as compared to purchasing the 5000 shares in one pass fully through visible (disclosed) quantities at worse prices.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A computerized method for placing orders for financial instruments, comprising:

receiving on a computer, from a first user, a first user order for a first financial instrument of a plurality of financial instruments, the first user order including a single first price per unit and a first unit quantity, the first unit quantity of the first user order including a disclosed liquidity quantity and an undisclosed liquidity quantity, both the disclosed liquidity quantity of the first user order and the undisclosed liquidity quantity of the first user order being at the same single first price per unit;

sending the first user order, including the disclosed liquidity quantity and the undisclosed liquidity quantity, to a first one of a plurality of trade execution entities for execution;

receiving on a computer, from a second user, a second user order for the first financial instrument that does not require that the trade execution entity be the first one of the trade execution entities, the second user order including a second price per unit and a second unit quantity;

determining on a computer that the first price per unit of the first user order and second price per unit of the second user order have overlapping values for least some of the undisclosed liquidity quantity of the first order; and sending the second user order to one of the plurality of trade execution entities after it is determined that the first price per unit of the first user order and second price per unit of the second user order have overlapping values for least some of the undisclosed liquidity quantity of the first order.

2. The method of claim 1, wherein, the second user order is sent to one of the plurality of trade execution entities after it is determined that the first price per unit of the first user order and second price per unit of the second user order have overlapping values for least some of the disclosed liquidity quantity of the first order and the undisclosed liquidity quantity of the first order.

3. The method of claim 1, wherein, if the first user order is a bid, the second user order is an offer, and if the first user order is an offer, the second user order is a bid.

4. The method of claim 1, wherein the plurality of trade execution entities include ECNs.

5. The method of claim 1, wherein the plurality of trade execution entities include ECNs, exchanges, and broker-dealers.

6. The method of claim 1, wherein the plurality of trade execution entities include ECNs and broker-dealers and wherein each of the first user order and the second user order includes a routing designation, and wherein each routing designation designates: i) one of the ECNs in the plurality of trade execution entities as the one of the plurality of trade execution entities that the order is to be sent to; ii) one of the market makers in the plurality of trade execution entities as the one of the plurality of trade execution entities that the order is to be sent to; or iii) any one of the ECNs and market makers as possibly the one of the plurality of trade execution entities that the order is to be sent to.

7. The method of claim 1, wherein the first user order is entered by the first user via a graphical user interface.

8. The method of claim 7, wherein the second user order is entered by the second user via a graphical user interface.

9. The method of claim 1, wherein at least one of the first user order and the second user order are entered via a user interface.

10. The method of claim 1, wherein at least one of the first user order and the second user order are not entered via a user interface.

11. The method of claim 1, further comprising receiving updated order book information from each of the plurality of trade execution entities, the updated order book information including, for each of the plurality of financial instruments, a current bid price with a corresponding disclosed liquidity quantity and a current offer price with a corresponding disclosed liquidity quantity.

12. The method of claim 1, wherein a plurality of computers are utilized.

13. The method of claim 1, wherein at least one of the first user order and the second user order is a pegged order that moves with an inside price associated with the first financial instrument.

14. The method of claim 13, wherein the pegged order is a bid.

15. The method of claim 13, wherein the pegged order is an offer.

16. The method of claim 13, wherein the pegged order is at the inside price.

17. The method of claim 13, wherein the pegged order is below the inside price.

18. The method of claim 13, wherein the pegged order is above the inside price.

19. Computer readable media, having stored thereon computer executable process steps operable to control a computer to perform steps comprising:
   receiving on a computer, from a first user, a first user order for a first financial instrument of a plurality of financial instruments, the first user order including a single first price per unit and a first unit quantity, the first unit quantity of the first user order including a disclosed liquidity quantity and an undisclosed liquidity quantity, both the disclosed liquidity quantity of the first user order and the undisclosed liquidity quantity of the first user order being at the same single first price per unit;
   sending the first user order, including the disclosed liquidity quantity and the undisclosed liquidity quantity, to a first one of a plurality of trade execution entities for execution;
   receiving on a computer, from a second user, a second user order for the first financial instrument that does not require that the trade execution entity be the first one of the trade execution entities, the second user order including a second price per unit and a second unit quantity;
   determining on a computer that the first price per unit of the first user order and second price per unit of the second user order have overlapping values for least some of the undisclosed liquidity quantity of the first order; and
   sending the second user order to one of the plurality of trade execution entities after it is determined that the first price per unit of the first user order and second price per unit of the second user order have overlapping values for least some of the undisclosed liquidity quantity of the first order.

20. The computer readable media of claim 19, wherein the computer executable process steps further comprise receiving updated order book information from each of the plurality of trade execution entities, the updated order book information including, for each of the plurality of financial instruments, a current bid price with a corresponding disclosed liquidity quantity and a current offer price with a corresponding disclosed liquidity quantity.

21. The computer readable media of claim 19, wherein a plurality of computers are utilized.

22. The computer readable media of claim 19, wherein at least one of the first user order and the second user order is a pegged order that moves with an inside price associated with the first financial instrument.

23. The method of claim 22, wherein the pegged order is a bid.

24. The method of claim 22, wherein the pegged order is an offer.

25. The method of claim 22, wherein the pegged order is at the inside price.

26. The method of claim 22, wherein the pegged order is below the inside price.

27. The method of claim 22, wherein the pegged order is above the inside price.

28. A computer system comprising one or more processors, the one or more processors configured to:
   receive on a computer, from a first user, a first user order for a first financial instrument of a plurality of financial instruments, the first user order including a single first price per unit and a first unit quantity, the first unit quantity of the first user order including a disclosed liquidity quantity and an undisclosed liquidity quantity, both the disclosed liquidity quantity of the first user order and the undisclosed liquidity quantity of the first user order being at the same single first price per unit;
   send the first user order, including the disclosed liquidity quantity and the undisclosed liquidity quantity, to a first one of a plurality of trade execution entities for execution;
   receive on a computer, from a second user, a second user order for the first financial instrument that does not require that the trade execution entity be the first one of the trade execution entities, the second user order including a second price per unit and a second unit quantity;
   determine on a computer that the first price per unit of the first user order and second price per unit of the second user order have overlapping values for least some of the undisclosed liquidity quantity of the first order; and
   send the second user order to one of the plurality of trade execution entities after it is determined that the first price per unit of the first user order and second price per unit of the second user order have overlapping values for least some of the undisclosed liquidity quantity of the first order.

29. The computer system of claim 28, wherein the one or more processors are further configured to receive updated order book information from each of the plurality of trade execution entities, the updated order book information including, for each of the plurality of financial instruments, a current bid price with a corresponding disclosed liquidity quantity and a current offer price with a corresponding disclosed liquidity quantity.

30. The computer system of claim 28, wherein a plurality of computers are utilized.

31. The computer system of claim 28, wherein at least one of the first user order and the second user order is a pegged order that moves with an inside price associated with the first financial instrument.

32. The computer system of claim 31, wherein the pegged order is a bid.

33. The computer system of claim 31, wherein the pegged order is an offer.

34. The computer system of claim 31, wherein the pegged order is at the inside price.

35. The computer system of claim 31, wherein the pegged order is below the inside price.

36. The computer system of claim 31, wherein the pegged order is above the inside price.

* * * * *